United States Patent [19]

Lovatt-Smith

[11] Patent Number: 4,797,434

[45] Date of Patent: Jan. 10, 1989

[54] PROCESS FOR THE MANUFACTURE OF PARTICULATE BITUMINIZED PLASTICS MATERIAL

[75] Inventor: Frederick D. Lovatt-Smith, Herstmonceaux, Great Britain

[73] Assignee: Denehunt Ltd., Heathfield, Great Britain

[21] Appl. No.: 2,697

[22] PCT Filed: Apr. 23, 1986

[86] PCT No.: PCT/GB86/00223

§ 371 Date: Feb. 20, 1987

§ 102(e) Date: Feb. 20, 1987

[87] PCT Pub. No.: WO86/06391

PCT Pub. Date: Nov. 6, 1986

[30] Foreign Application Priority Data

Apr. 23, 1985 [GB] United Kingdom ............... 8510317

[51] Int. Cl.$^4$ .................... C08L 23/06; C08L 27/06; C08L 95/00
[52] U.S. Cl. ...................... 524/60; 524/59; 524/567; 524/585; 528/499; 528/502; 428/407; 428/489; 428/903.3; 427/222; 106/277
[58] Field of Search ............. 524/59, 60; 528/502, 528/499, 497; 427/222; 428/489, 403, 407, 903.3; 521/45, 46.5; 106/277

[56] References Cited

U.S. PATENT DOCUMENTS

| | | | |
|---|---|---|---|
| 4,172,821 | 10/1979 | Bloombaum et al. | 524/60 |
| 4,177,079 | 12/1979 | Espenscheid | 521/46.5 X |
| 4,410,646 | 10/1983 | Romey et al. | 524/60 X |
| 4,544,690 | 10/1985 | Ladish | 524/60 |
| 4,576,648 | 3/1986 | Demangeon et al. | 524/60 X |

FOREIGN PATENT DOCUMENTS

| | | | |
|---|---|---|---|
| 1215899 | 3/1966 | Fed. Rep. of Germany | 524/59 |
| 2146915 | 3/1972 | Fed. Rep. of Germany | 524/59 |
| 2549794 | 5/1976 | Fed. Rep. of Germany | 521/46.5 |
| 1427307 | 3/1976 | United Kingdom | 524/59 |

Primary Examiner—Joseph L. Schofer
Assistant Examiner—Fred M. Teskin
Attorney, Agent, or Firm—Bacon & Thomas

[57] ABSTRACT

A process for the manufacture of particulate material, and particularly material for constructing a horse riding surface, involves mixing raw granulated plastics material, such as PVC from waste electric cable, with a bitumen emulsion and water in such a way that the granules are coated while significant agglomeration is avoided. The bitumen emulsion is preferably 40% cationic. The water may be added as a bulk at lower pressure and a small amount at high pressure which is moved around to promote mixing.

10 Claims, No Drawings

PROCESS FOR THE MANUFACTURE OF PARTICULATE BITUMINIZED PLASTICS MATERIAL

This specification relates to a process for the manufacture of particulate material and is particularly, but not exclusively, concerned with the manufacture of material for use as a horse riding surface.

It has been proposed to make a horse riding surface from raw granulated plastics material, such as PVC. Such material is readily available as the by-product of reclaiming metal from plastics coated electric wires, cables and the like, and is relatively inexpensive.

Riding surfaces made from this material have certain drawbacks. Firstly, the material does not compact very well and tends to slide away from under a horse's hooves. Secondly, the material is not very dense and, for example, can blow away in a breeze. Thirdly, the material tends to have a significant dust content, which is undesirable.

There is, therefore, disclosed herein a particulate material manufactured from raw granulated plastics material which has been bituminized. This material is denser and compacts in a better manner than the raw material. Furthermore, dust is substantially eliminated. The bitumen used is relatively cheap, weather resistant and non-toxic. An important feature is that the bitumen remains adhered to the plastics granules but does not adhere to a horse's hooves.

In broad terms, a process for manufacturing the material includes the steps of mixing the raw granulated plastics material with bitumen emulsion and water in such a way that the granules are coated whilst significant agglomeration is avoided. To have the granules agglomerate into substantial lumps would be unacceptable.

In a preferred process, a mixing drum is filled with the raw plastics material, and there are added—generally simultaneously—the required quantity of bitumen, a relatively large quantity of water at low pressure, and a relatively small quantity of water at high pressure. This high pressure water agitates the mixture and promotes coating without agglomeration. Other mixing means—such as stirrers—could be used.

The bitumen and water could be added by completely separate nozzles, for example, or by three nozzles feeding into one outlet.

A particular example of a suitable process will now be described although it will be appreciated that modifications and variations will be possible.

In this example, a large rotatable mixing drum is used, of a type normally employed for mixing concrete. The drum has a capacity of 6 cubic meters. About 4½ tons of raw granulated PVC is fed into the drum by a conveyor which receives the PVC from a hoper. The drum is then rotated.

Water and bitumen emulsion are then added. The preferred emulsion is cationic 40%, for example in accordance with British Standard 434, Part II, Class K1-40. Such an emulsion is available from Kelbit Limited. Other cationic bitumen emulsions might be usable, such as 60% or 55% but the 40% emulsion has been found to give particularly good results. Anionic emulsion will generally not adhere properly to the PVC.

The emulsion is added in a quantity in the range of about 40-50 liters per ton of PVC. The preferred quantity, which gives especially good results, is 44 liters per ton, which gives about 200 liters for the 4½ ton PVC load in this example. In practice, for simplicity, a 200 kg drum could be added.

The quantity of water added for the full load of PVC and emulsion is about 230 gallons, i.e. 1046 liters. This is a ratio in the range of about 200 to 250 liters per tone of PVC, and in this case is about 230 liters per ton.

The major part of the water is added at a relatively low pressure whilst the smaller part is added at a high pressure. In this particular example, the ratio is 20:3, i.e. 200 gallons of low pressure to 30 gallons of high pressure for the full load. Ratios in the range of 5:1 to 10:1 might be acceptable.

The high pressure water can be distributed over the load by an operative, to ensure proper mixing and even bitumenizing without agglomeration, e.g. by moving a hose around.

Mixing in the drum continues for about five minutes, following which the bitumenized material is removed, drained, and stored for future use. The water which drains from the material is clear, showing that virtually all of the bitumen has been taken up.

In a typical application of the material, a riding surface comprises a drainage membrane, a 100 mm layer of clean limestone, a 40 mm layer of open textured macadam, an optional layer of sharp washed sand, and a 95 mm top layer of the bitumenized material. Such a surface has particularly good properties and can be used as a riding surface for indoor and all-weather riding arenas as well as for e.g. training gallops. Of course, the material may have uses in other contexts.

As regards starting material, this tends to include certain impurities in addition to PVC, and particularly rubber, and cotton or other dust. The material is therefore firstly screened to extract any large foreign bodies, and then cleaned. This can comprise washing over a separating table (where vestiges of copper can be removed) and/or passing over extractor fans to remove dust. Rubber granules will tend to remain in the material but will not significantly alter its properties if in small quantities. It has been found that rubber tends to deteriorate, whilst PVC has an extremely long life.

The precise composition and grade (i.e. granule size) of the starting material tends to vary in view of the nature of its source. Specific grades could be selected for particular purposes, or mixtures used. The nature of the starting material may depend on the type of process used for extraction of copper. Thus, in a wet process there is likely to be a mixture of grades produced. On the other hand, a dry process may provide separated grades which can then be blended in required proportions to produce preferred mixtures. Furthermore, the plastic may be other than PV—for example being polyethylene where telephone cables are used as the starting material—or may be a mixture.

In use as a riding surface where installation involves an underlying layer of sand, the sand will mix with the bituminized material after a while. It may be possible to add the sand during the manufacturing process instead or additionally, although this will increase costs of e.g. transport; sand is usually available locally.

As regards the bitumen, it will be appreciated that the invention extends to substitute materials which will have similar properties.

The use of relatively high pressure water during the process, in addition to relatively low pressure water, is advantageous. The actual pressures involved will depend on many factors but the aim is to fill the drum in an acceptably short time whilst providing suitable high pressure agitation.

In general, it will be appreciated that many variations are possible whilst retaining at least some of the advantages of the process and of the final product.

I claim:

1. A process for manufacturing particulate bitumenized plastics material, comprising the steps of providing raw granulated plastics material, adding to said plastics material cationic bitumen emulsion and water to form a mixture, the quantity of added water being substantially greater than the quantity of bitumen emulsion, agitating said mixture to produce particulate plastics material coated with bitumen in which significant agglomeration of the particles is avoided, and separating said particulate material coated with bitumen from said water.

2. A process as claimed in claim 1 wherein the bitumen emulsion is 40% cationic.

3. A process as claimed in claim 1 wherein the raw plastics material comprises polyvinylchloride and/or polyethylene.

4. A process as claimed in claim 1 wherein the quantity of emulsion used is in the range of 40–50 liters per ton of plastics material.

5. A process as claimed in claim 4, wherein the quantity of emulsion used is 44 liters per ton of plastics material.

6. A process as claimed in claim 1 wherein the quantity of water used is in the range of 200 to 250 liters per ton of plastics material.

7. A process as claimed in claim 6, wherein the quantity of water used is 230 liters per ton of plastics material.

8. A process as claimed in claim 1 wherein the water is added as a relatively large quantity of water at a first pressure, and a relatively small quantity of water at a second, higher pressure.

9. A process as claimed in claim 8, wherein the volume ratio of lower pressure water to higher pressure water is in the range of 5:1 to 10:1.

10. A process as claimed in claim 8 wherein the position of supply of the higher pressure water is moved around.

* * * * *